United States Patent [19]

Yoon

[11] Patent Number: 5,087,081
[45] Date of Patent: Feb. 11, 1992

[54] WATER SUPPLY HOSE CONNECTING DEVICE FOR WASHING MACHINE

[75] Inventor: Eui-Chang Yoon, Seoul, Rep. of Korea

[73] Assignee: Samsung Electronics Co., Ltd., Suwon City, Rep. of Korea

[21] Appl. No.: 561,523

[22] Filed: Jul. 31, 1990

[30] Foreign Application Priority Data

Aug. 1, 1989 [KR] Rep. of Korea .................. 89-11459

[51] Int. Cl.$^5$ .............................................. E03C 1/00
[52] U.S. Cl. ...................................... 285/8; 285/175; 285/323; 285/316; 285/921
[58] Field of Search ............... 285/175, 8, 323, 305, 285/375

[56] References Cited

U.S. PATENT DOCUMENTS

| | | | |
|---|---|---|---|
| 1,580,694 | 4/1926 | Smith | 285/175 X |
| 2,305,841 | 12/1942 | Carlson | 285/175 X |
| 2,700,559 | 1/1955 | Jensen | 285/375 X |
| 3,503,637 | 3/1970 | Sosaburo Maeshiha | 285/375 X |
| 3,779,587 | 12/1973 | Racine | 285/323 X |
| 3,868,132 | 2/1975 | Racine | 289/323 X |
| 4,142,739 | 3/1979 | Billingsley | 285/323 X |
| 4,432,570 | 2/1984 | Kemppainen | 285/175 X |

FOREIGN PATENT DOCUMENTS

| | | |
|---|---|---|
| 56-121596 | 9/1981 | Japan . |
| 57-81395 | 5/1982 | Japan . |
| 198793 | 4/1989 | Japan . |
| 1000961 | 8/1965 | United Kingdom ............... 285/175 |

Primary Examiner—Dave W. Arola
Assistant Examiner—Carol I. Bordas
Attorney, Agent, or Firm—Cushman, Darby & Cushman

[57] ABSTRACT

A water supply hose connecting device for a washing machine which is easy to couple with and release from a water tap and which is capable of preventing water leakage. The water supply hose connecting device for a washing machine includes an upper connecting member for the device in a watertight manner to a water tap, an intermediate connecting member formed with a female threaded portion so as to be threadedly coupled to a male threaded portion formed on the upper connecting member. A lower connecting member is formed with openings and a flange so as to be firmly coupled to the intermediated member. A control member is provided for controlling the coupling and releasing of the intermediate connecting member and lower connecting member.

3 Claims, 5 Drawing Sheets

WATER SUPPLY HOSE CONNECTING DEVICE FOR WASHING MACHINE

BACKGROUND OF THE INVENTION

1. Field of the Invention

The present invention relates to a water supply hose connecting device for a washing machine, and more particularly, to a water supply hose connecting device for a washing machine which is easy to mount to and to take off from a water tap and which is also capable of preventing water leakage.

2. Description of the Prior Art

A conventional water supply hose connecting device for a washing machine is disclosed, for example, in Japanese laid-open patent official gazette Nos. Sho-57-8139, Heisei-1-98793, and Sho-56-121596. Another conventional typical water hose connecting device for a washing machine is shown in FIG. 5, in which reference numeral 21 represents a water tap, and reference numeral 24 represents an upper connecting member for connecting with the water tap 21. To this upper connecting member 24, four screws 22 (only two of which are shown in drawing) for firmly fixing the device to the water tap 21 so as not to separate under high water pressure of the service water are fixed in rectangular relation each other. To an interior area of the upper connecting member 24, i.e., to a portion for contacting with the water tap 21, a packing 23 is provided which is a substantially cylindrical shape formed with hollows for passing the service water at its center in order to prevent leakage of the service water.

Also in FIG. 5, reference numeral 25 represents an intermediate connecting member, reference numeral 25c represents O-ring for preventing leakage through a gap between the intermediate connecting member 25 and a lower connecting member 27, and reference numeral 30 represents a spring for holding resiliently the relation between the lower connecting member 27 and a handle 28b.

However, the water hose connecting device for a washing machine shown in FIG. 5, since it should be fixed to the water tap 21 by using four screws 22, may not be easily fixed or released, and in case the external shape of the water tap 21 is rectangular shape or screw shape, it can not be coupled in a watertight manner to the water tap 21. Therefore, there has been a problem that the service water leaks from a gap formed between the water tap 21 and the packing 23.

SUMMARY OF THE INVENTION

Therefore, an object the present invention is to solve such various problems, and it is an object of the present invention to provide a water supply hose connecting device for a washing machine capable of easily fixing to and releasing from the water tap, and being capable of easily executing the assembling and disassembling of an upper connecting member with an intermediate connecting member as well as the assembling and disassembling of the intermediate connecting member with the lower connecting member and at the same time being capable of preventing generation of water leakage at a connecting portion between the connecting device and the water tap in case of supplying service water to the washing machine.

In order to accomplish above objects, a water supply hose connecting device for a washing machine according to the present invention comprises:

an upper connecting member for coupling to a water tap in a watertight manner, an intermediate connecting member formed with a female threaded portion so as to be screwed to a male threaded portion formed to the upper connecting member, a lower connecting member formed with an opening and a flange so as to be firmly coupled to the intermediate connecting member, and a control member for controlling the fixing and releasing of the intermediate connecting member and the lower connecting member.

The forgoing and other objects as well as advantages of the present invention will become clear from the following description of the invention, with reference to the accompanying drawings.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION OF A PREFERRED EMBODIMENT OF THE INVENTION

Hereinafter, the water supply hose connecting device for a washing machine according to the present invention will be described in detail with reference to the accompanying drawings.

Figure 1:
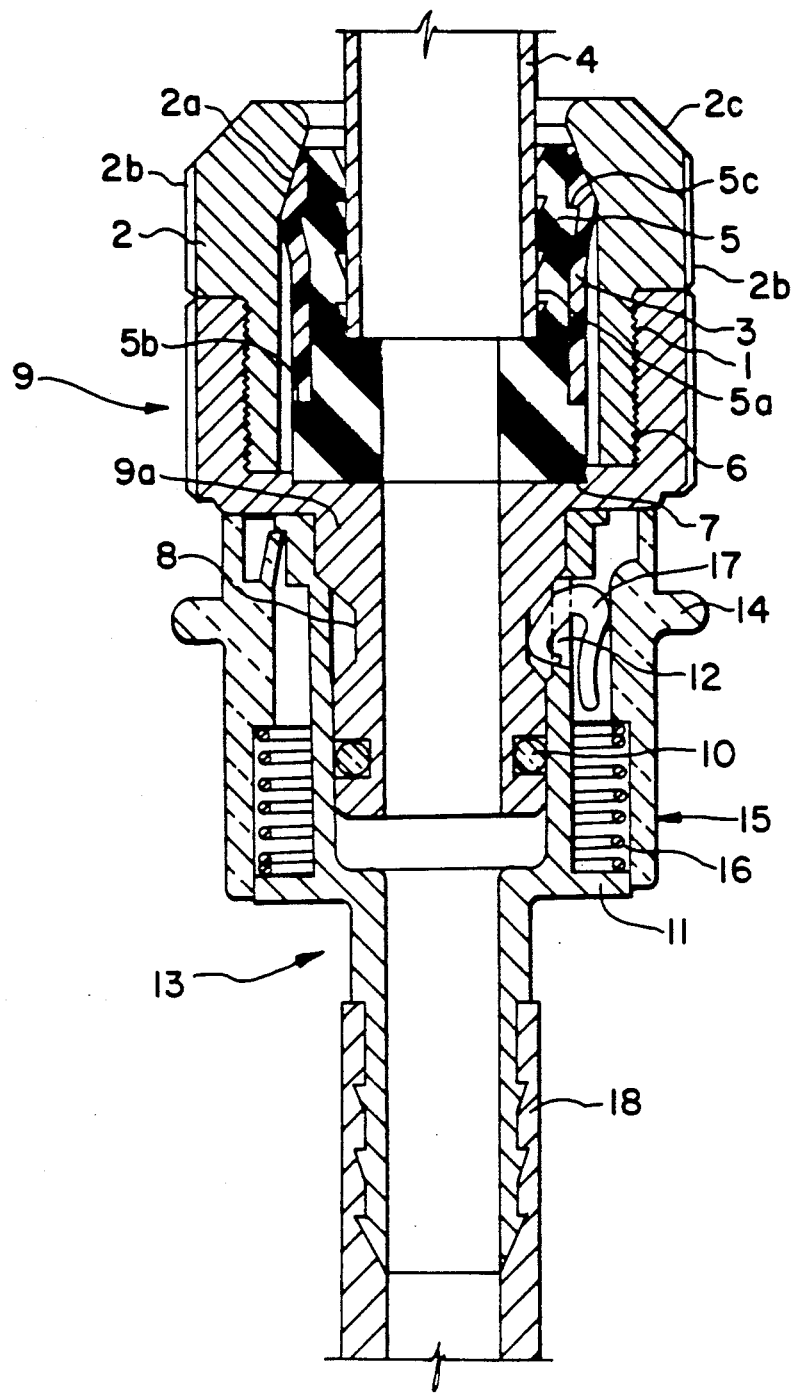
FIG. 1 is a longitudinal cross-sectional view of a water supply hose connecting device for a washing machine coupled to a water tap, according to the present invention.
Figure 2:
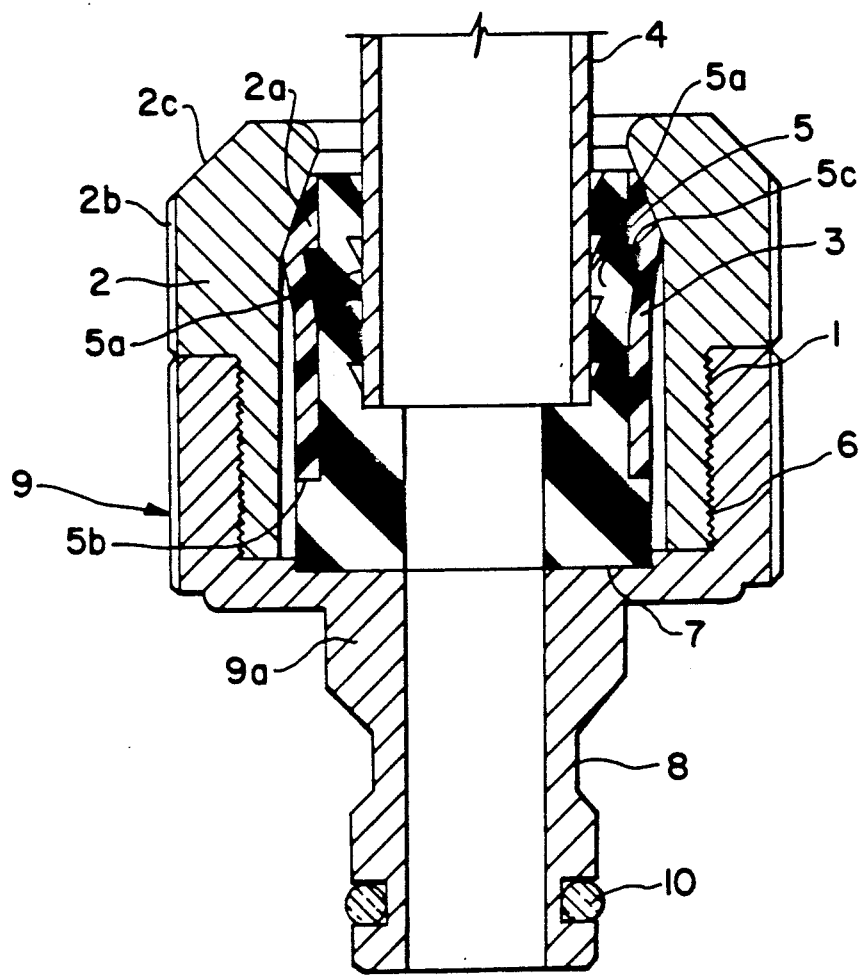
FIG. 2 is a fragmentary longitudinal cross-sectional view of an assembled state of an upper connecting member with an intermediate connecting member according to the present invention.
Figure 3:
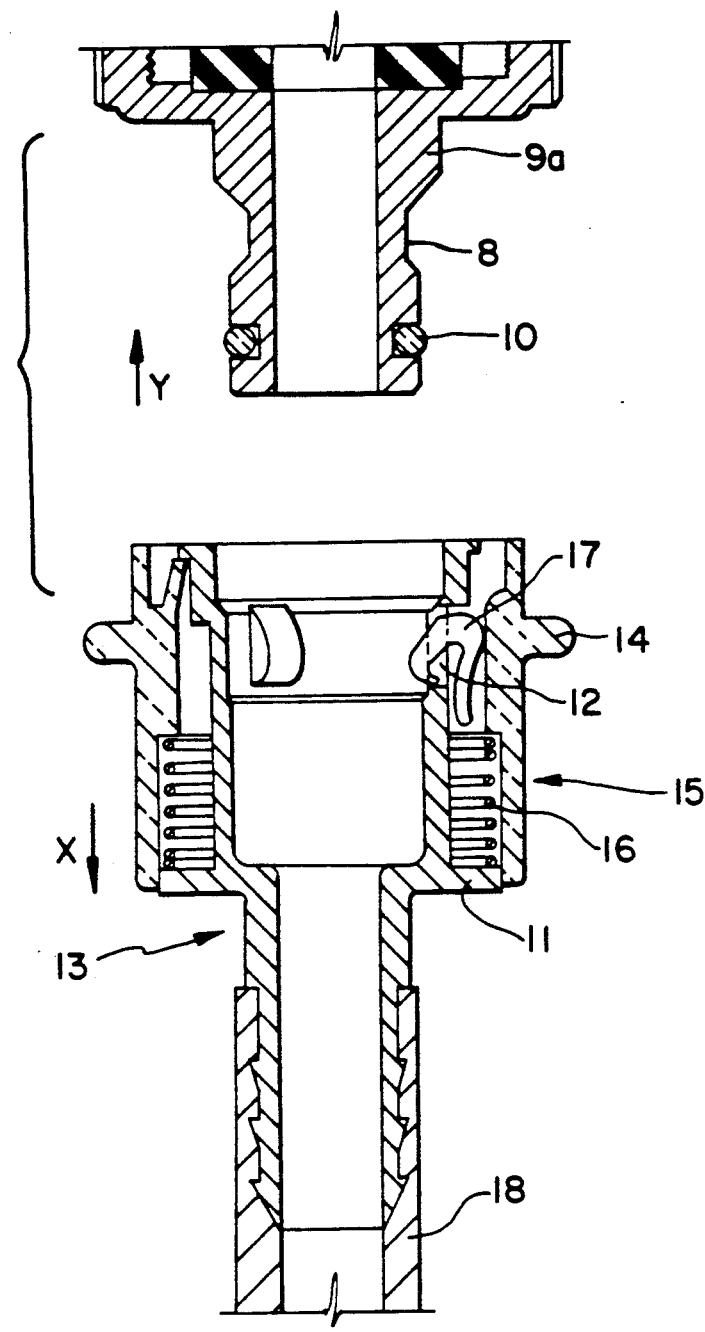
FIG. 3 is a fragmentary longitudinal cross-sectional view of an assembled state of an intermediate connecting member and a lower connecting member of the present invention.
Figure 4:
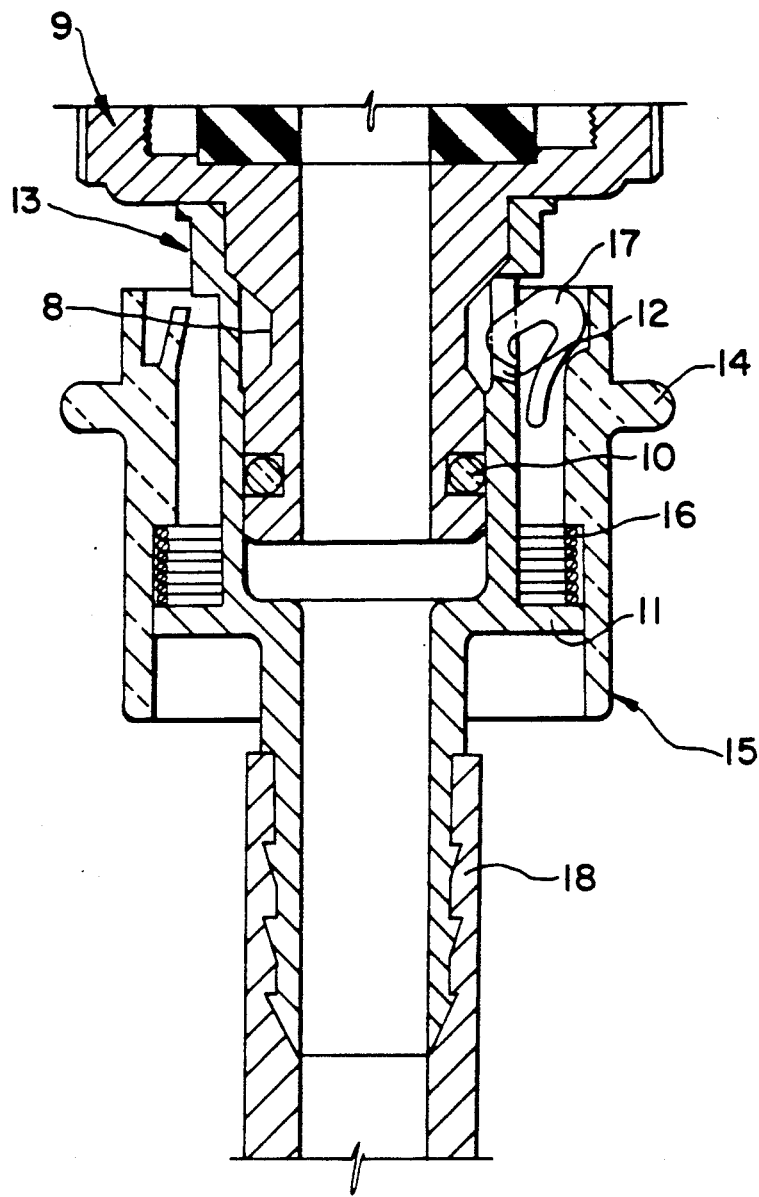
FIG. 4 is a fragmentary longlitudinal cross-sectional view of an operating state of a lower connecting member of the present invention.
Figure 5:
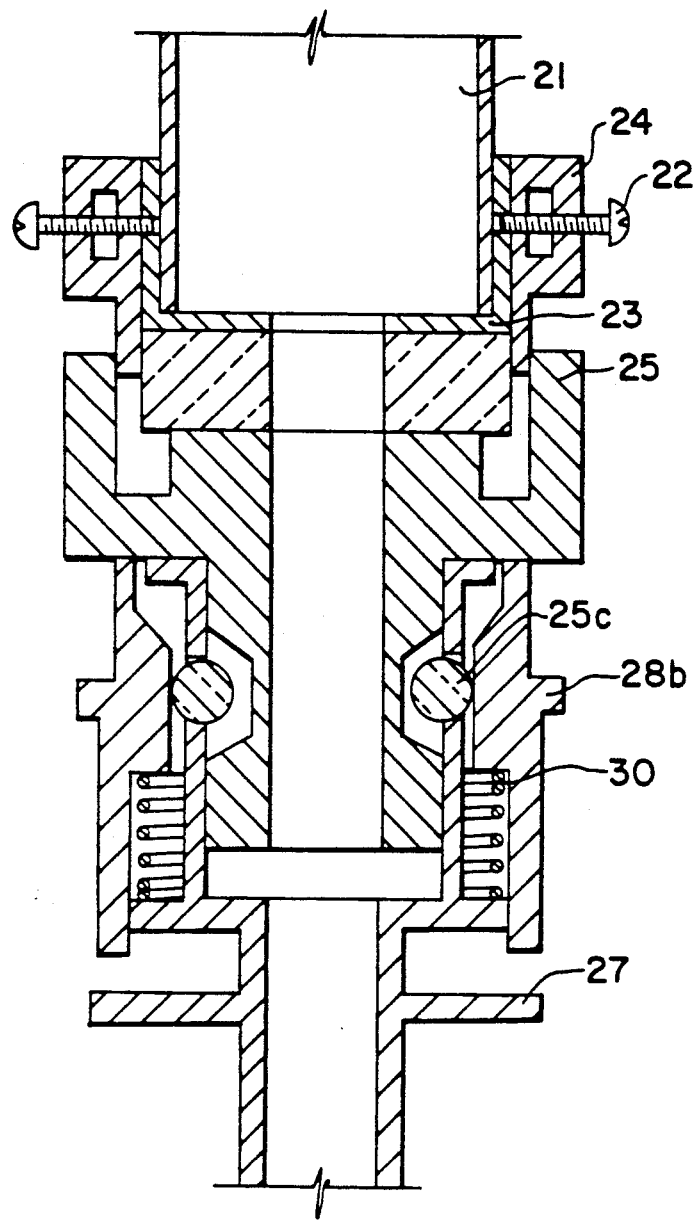
FIG. 5 is a longitudinal cross-sectional view of a conventional water supply hose connecting device for a washing machine.

FIG. 1 is a longitudinal cross-sectional view for showing a water supply hose connecting device for a washing machine according to the present invention, which connecting device is coupled to a water tap, FIG. 2 is a fragmentary longitudinal cross-sectional view for illustrating an assembled state of an upper connecting member with an intermediate connecting member in the present invention. FIG. 3 is a fragmentary longitudinal cross-sectional view for illustrating an assembled state of the intermediate connecting member with a lower connecting member in the present invention. FIG. 4 is fragmentary longitudinal cross-sectional view for illustrating an operating state of the lower connecting member of the present invention.

Referring to FIG. 1, reference numeral 2 indicates an upper housing, which is formed with hollows for passing the service water at the center thereof, to which inside and outside of upper portion thereof, an external slant surface 2c of tapered shape and an internal slant surface 2a with its diameter being gradually decreased toward the tap direction are repectively formed, and to which lower portion, a male threaded portion 1 to be coupled in screw manner with a female threaded portion formed at the upper interior of an intermediate housing as will be described hereinafter is formed. To the external circumferential flat surface of the upper housing 2, i.e., from the bottom end of the external slant surface 2c to the top end of the male threaded portion 1, a concave and convex surface 2b is formed with cutout portions in a predetermined distance, so as to be able to easily execute the insertion to the water tap 4 and the assembling with an intermediate connecting member as will be described hereinafter. In FIG. 1, reference numeral 5 indicates a packing made of natural rubber, silicon rubber or synthetic rubber or the like, having resiliency, and to the internal surface of this packing 5, a plurality of annular protrusions 5a are formed which serve so as to clamp firmly in case it is coupled with the water tap 4. To its external surface, annular protrusions 5c and flange 5b are respectively formed. Reference numeral 3 indicates a fixing cap made of plastic, and to the internal circumferential wall suface of which lower portion, a click portion engaging with the packing 5 is formed, and to its external circumferential wall surface, a tapered slant surface is formed, which is guided by the internal slant surface 2a of said upper housing 2 as the packing being pushed up, so that the diameter of the packing 5 provided within its interior is made to become reduced toward the center, although it is not shown in the drawing. A plurality of cutout portions are formed along lengthwise in a predetermined distance so as to be reduced in diameter when it is pushed by the internal slant surface 2a of the upper housing 2 from the upper end portion to the substantially intermediate portion between the click portion of neighboring fixing cap 3. Therefore, the upper connecting member includes the upper housing 2, a fixing cap 3 and the packing 5.

An intermediate housing 9 is formed with hollows for passage of service water at the center thereof, a female threaded portion 6 is formed at its inner side of upper portion which is threadedly coupled with a male threaded portion formed integrally at the bottom end portion of the upper housing 2. A recess 7 is formed at the center of the bottom surface so as to be able to prevent water leakage by coupling in a watertight manner with the bottom surface of the flange 5b of the packing 5. A recess 8 is formed at the middle of the external circumferential surface of the lower piping portion 9a of the intermediate housing 9 in which its side walls of upper and lower portion are tapered so as to be able to be coupled with the click which may be coupled between the lower connecting member and the lower housing as will be described hereinafter. An O-ring 10 is provided, in which when using the present invention coupling to connect the water supply hose for a washing machine and a water tap 4, it may be easily coupled so that the service water does not leak between the lower piping portion 9a of the intermediate housing 9 and the lower connecting member 13.

In FIG. 1, reference numeral 15 indicates a lower housing formed integrally with a handling 14. Reference numeral 17 indicates a click which may be coupled with a recess 8 formed to the lower piping portion 9a so that it is made to keep firmly coupled with the upper housing 9. Reference numeral 18 indicates a water supply hose coupled by cripping to the piping portion of the lower connecting member 13.

In the center of the lower connecting member 13, a passageway for passage of service water is formed similarly as the upper housing 2 or the intermediate housing 9. At least two openings 12 are formed at the upper side wall, and a flange 11 is integrally formed which serves as a supporting base of the spring 16 by projecting rectangularly against the intermediate outside wall. A flange is integrally formed which serves as a supporting base plate for the resilient means, i.e., a coil spring 16 provided between the flange 11 and the lower housing 15. Control means for controlling the coupling of the intermediate connecting member with the lower connecting member 13 include the click 17, the spring 16 and the openings 12 formed in the lower housing 15.

Next, the operation of the water supply hose connecting device for a washing maching according to the present invention constructed as described above will be described in detail with reference to the FIGS. 2 to 4. As shown in FIG. 2, when the upper connecting member comprising the upper housing 2, the fixing cap 3 and the packing 5 is inserted into the water tap 4 and thereafter the male threaded portion 1 formed on the upper housing 2 is screwed to the female threaded portion 6 formed on the upper inner side of the intermediate housing 9, since the diameter of the fixing cap 3 is reduced along with the internal slant surface 2a formed to reduce the diameter toward the upper direction at the internal surface of the upper housing 2. The bottom surface of the flange 5b of the packing 5 is inserted into and contacted with the recess 7 formed at the intermediate housing 9 and thereby this packing 5 is pushed up, so that as the diameter of the fixing cap 3 is reduced along with the internal slant surface 2a formed to reduce the diameter toward upper direction at the internal surface of the upper housing 2, the interior surface of the packing 5, i.e., a plurality of annular protrusions 5a are pushed toward the water tap 4 thereby being closely contacted in watertight manner. Therefore, even when the pressure of the service water is high, the coupling of the upper connecting member with the water tap 4 is not released, and also the generation of water leakage can be prevented. That is, since a plurality of annular protrusions 5a are formed toward the lower direction in the drawing on the interior surface of the packing 5, not only is no gap between the packing 5 and the water tap 4 produced, but also being clamped firmly, and since the bottom surface of the flange 5b of the packing 5 is coupled in water tight with the recess 7 formed integrally at the intermediate housing 9, even if the pressure of the service water is high, it is not released from the water tap 4, and also the the generation of water leakage does not occur. Usually, it is of course possible for the device to be used in a state in which the intermediate connecting member is omitted and only the upper connecting member is coupled.

As shown in FIG. 2, in case that it is desired to supply the service water in a state in which the upper connecting member and the intermediate connecting member are coupled to the water tap 4, as shown in FIG. 3, in a state in which the handle 14 formed integrally with the lower housing 15 is pulled toward the arrow direction X, when the lower connecting member 13 is pushed up toward the arrow direction Y and being inserted into the lower piping portion 9a of the intermediate housing 9 and thereafter the handle is released, the lower housing 15 is pushed by the resiliency of the spring 16, so that the internal wall surface of the lower housing 15 pushes the click 17 into the recess 8 formed to the lower piping portion 9a of the intermediate housing 9, therefore, the intermediate connecting member and the lower connecting member are firmly coupled. At this moment, when the water tap 4 is turned on and the service water is supplied to the washing tank of the washing machine, water leakage can be prevented by the packing 5 made of natural rubber, silicon rubber or synthetic rubber or the like between the upper housing 2 and the intermediate housing 9, as well as an O-ring inserted into the annular groove formed at the lower piping portion 9a.

When the coupling of the intermediate connecting member with the lower connecting member 13 is desired to be released it is done by executing in reverse, relative to their order in the above description. That is, when the handle 14 of the lower housing 15 is moved down in a direction of arrow X of FIG. 3 against the resiliency of the spring 16 and thereafter the lower connecting member 13 is moved to a direction of arrow Y, it is easily released.

As described before, according to the water supply hose connecting device for a washing machine of the present invention, there are excellent effect results, in that assembling and disassembling are easy, and the coupling of the upper coupling member with the water tap can be easily executed and at the same time water leakage can be prevented even when supplying service water to a washing machine, and also the coupling and releasing of the intermediate connecting member with the lower connecting member is easy.

It will be appreciated that the present invention is not restricted to the particular embodiment that has been described hereinbefore, and that variations and modifications may be made therein without departing from the spirit and scope of the invention as defined in the appended claims.

What is claimed is:

1. A water supply hose connecting device for connecting a washing machine water supply hose with a water tap, comprising:
   an upper connecting member comprising; a first assembly of parts having a first longitudinal throughbore, means for coupling one end of said throughbore to a water tap in a watertight manner, and a band of external threading;
   an intermediate connecting member comprising: a second assembly of parts having a second longitudinal throughbore, means providing an internally threaded socket at an upper end of said second longitudinal throughbore, and means providing a lower piping portion extending axially downwards around said second throughbore from said socket, said lower piping portion having a radially outer sidewall surface provided intermediate said socket and an open lower end of said second throughbore with a radially outwardly opening circumferentially extending recess;
   said band of external threading threadedly connecting said upper connecting member with said internally threaded socket of said intermediate member so that said second longitudinal throughbore effectively forms a longitudinal continuation of said first longitudinal throughbore;
   a lower connecting member comprising: a third assembly of parts having a third longitudinal throughbore, an upper tubular portion shaped and sized to axially slidingly telescopically receive said lower piping portion of said intermediate connecting member so that said third longitudinal throughbore forms a longitudinal continuation of said second longitudinal throughbore and said radially outwardly opening circumferentially extending recess is radially surrounded by wall means of said upper tubular portion, a lower tubular portion extending longitudinally from said upper tubular portion and including means for securely connecting with a water supply hose for causing said third longitudinal throughbore to form a longitudinal continuation of said water supply hose, radially movable click means releasably engageable in said recess, through said wall means, for releasably locking said upper tubular portion of said lower connecting member in telescoped relation with said lower piping portion of said intermediate connecting member, axially movable control means changeably surrounding said click means for, in a first, upper position forcing said click means to protrude radially inwardly for locking said click means engaged in said recess and a second, lower position in which said click means are free to withdraw radially outwardly from said recess, and resilient means acting between said upper tubular portion and said axially movable control means for tending to maintain said axially movable means in said first, upper position;
   an O-ring seal; and surface means on said lower piping portion and said upper tubular portion mounting said O-ring seal and sealed therewith when said intermediate connecting member is locked in telescoped relation with said lower connecting member for providing an effectively sealed joint between said second and third longitudinal throughbores.

2. The connecting device of claim 1, wherein:
said first assembly of parts comprises: a tubular upper housing having a longitudinal throughbore with an internal sidewall which is tapering upwardly in an upper end portion thereof; a tubular body of rubber packing having said first throughbore and having a series of axially spaced annular protrusions on an internal surface thereof for facilitating telescopically surrounding and sealingly connecting with said water tap; a tubular fixing cap mounted on said rubber packing so as to provide an external annular collar on an upper portion of said rubber packing, said fixing cap having an external upwardly tapering surface arranged to be engaged by said tapering upper end portion of said internal sidewall of said upper housing, for effectively squeezing said rubber packing against said water tap as said upper connecting member is being threadedly connected with said intermediate connecting member.

3. The connecting device of claim 2, wherein:
said resilient means comprises a compression coil spring reacting between a downwardly facing shoulder internally provided on said axially movable control means and an upwardly facing shoulder externally provided on said upper tubular portion of said lower connecting member; and
said axially movable control means further includes an externally accessible handle for facilitating manual vertical downward movement thereof relative to said upper tubular portion of said lower connecting member for thereby freeing said click means to radially outwardly retract, and for compressing said compression coil spring.

* * * * *